United States Patent Office
2,928,820
Patented Mar. 15, 1960

2,928,820

POLYETHYLENE PROCESS

Gaetano F. D'Alelio, South Bend, Ind., assignor, by mesne assignments, to W. R. Grace & Co., New York, N.Y., a corporation of Connecticut No Drawing. Application October 30, 1957
Serial No. 693,230

9 Claims. (Cl. 260—94.9)

This invention pertains to a novel synthesis of ethylene polymers.

More particularly, the invention involves making polyethylenes varying from oils to solids by subjecting ethylene in an inert solvent, with or without pressure, to the action of an activated iron metal catalyst prepared by heating together iron metal as wire, turnings, powder or the like with $TiCl_4$ whether or not in the presence of ethylene.

In general, the iron-containing catalyst of this invention is prepared by treatment of Fe metal with $TiCl_4$ at any temperature between about 130° C. and the melting point of iron (1535° C.) for a time sufficient at least to discolor the Fe surface.

It has been found that the nature of the catalyst largely determines the nature of the polyethylene polymer, i.e., whether the product contains any substantial amount of solid polymer. As a general rule, if any material amount of hydrocarbon-soluble chlorides (i.e., $FeCl_3$, $FeCl_2$ and/or $TiCl_4$) is present in the reaction mixture along with the $TiCl_4$-treated iron metal, the polymers resulting are oils of varying degrees of viscosity, and little or no solid polyethylene separates from the oil. Accordingly the nature of the polymer product will be determined largely by the presence or absence of $FeCl_3$, $FeCl_2$ and/or $TiCl_4$ in, or adherent to, the metal catalyst, or in the reaction mixture. A preferred procedure for removing hydrocarbon soluble chlorides from the catalyst mass comprises one or more initial washes with hydrocarbon known to form complexes with iron chlorides and $TiCl_4$, e.g., benzene or toluene, followed by one or more washes with a non-complexing hydrocarbon, e.g., heptane, to remove any residual iron or titanium chloride-benzene or iron or titanium chloride-toluene complex. However, this particular means of chloride removal is by no means critical, since several washes with non-complexing hydrocarbons will accomplish the same result. Also, the hydrocarbon-soluble chlorides may be removed by other means obvious to one skilled in the art, e.g., by heating the Fe-containing mass and subliming such chlorides from the catalyst in a stream of inert gas, such as nitrogen, argon, or the like.

Example I

An electrically-heated vertical furnace made of a quartz tube 10 inches long and ¾ inch I.D., wrapped with electrical resistance wire was filled with Fe turnings (about 40 g.) and gradually heated to 400° C. It was maintained at this temperature for 12 hours while passing a vapor mixture of $TiCl_4$ in $N_2$ through the turnings. During this time considerable iron chloride formed on the metal, but most of it sublimed away during the reaction. The metal was allowed to cool to room temperature in a stream of nitrogen.

In this example, the $TiCl_4$—$N_2$ vapor mixture was provided by bubbling dry $N_2$ through a flask of $TiCl_4$ at room temperature. The resultant mixture contained about 0.15 vol. percent of $TiCl_4$, and was passed into the furnace at the rate of about 10.8 cc. per minute. This is equivalent to a $TiCl_4$:Fe mole ratio of substantially 1:1400, based on $TiCl_4$.

In forming the catalyst, it is considered essential to discontinue the reaction of $TiCl_4$ with Fe before the Fe is completely consumed, so that the material formed will consist essentially of Fe with the reaction product of Fe with $TiCl_4$. The nature of this reaction product has not been definitely established, and in fact it appears to vary in composition depending on the conditions of reaction. Thus, the composition of such reaction product formed when Fe is boiled in $TiCl_4$ (at 136° C.) for 2–48 hours appears to be different from the composition of the product formed when Fe is heated at 200–500° C. with $TiCl_4$. In each case, however, it appears that some amount of a lower chloride of Ti is formed, i.e., $TiCl_2$ and/or $TiCl_3$, so that my experimental data are consistent with the theory that the catalyst comprises at least Fe plus $TiCl_2$ and/or $TiCl_3$, possibly with some by-product $FeCl_3$ or $FeCl_2$. However, I do not wish to be bound by any theory of operation; it suffices to say that when Fe is heated with $TiCl_4$ in the manner herein described, a highly active catalyst is formed that is capable of polymerizing ethylene.

Example II

Twenty grams of Fe catalyst prepared by the procedure of Example I was washed with toluene, then again with heptane, to remove nearly all residual $FeCl_3$ and any other hydrocarbon-soluble chlorides, and then placed in a 200 ml.-capacity stainless steel rocking autoclave containing 50 ml. heptane. The autoclave was connected to a source of ethylene, sealed, and heated to the reaction temperature of 75° C. The ethylene pressure was initially in the range of 300–500 p.s.i.g., and from time to time over the reaction period of two days the autoclave was repressured to 500 p.s.i. of ethylene. At the end of the reaction the autoclave was cooled, vented, and the reaction mixture transferred to a beaker containing 200 ml. of methanol (acidified with a little HCl to dissolve metallic impurities) and boiled for 2 hours. The purified solid polyethylene was then filtered and dried; yield, 40 grams.

Example III

The procedure of Example I was followed except that the furnace temperature was 300° C., and after reaction the system was cooled by continuing the stream of $TiCl_4$—$N_2$, whereby a small amount of $TiCl_4$ condensed on the catalyst.

Example IV

About 20 g. of catalyst prepared by the procedure of Example III was placed in 50 ml. of toluene and transferred to a 200 ml. stainless steel rocking autoclave, to which 1 ml. $TiCl_4$ was then added. The autoclave was charged with ethylene to 155 p.s.i., sealed, and heated to 150° C. under the autogenous pressure for 36 hours, after which it was cooled, vented, and opened. A very good yield of viscous polyethylene oil was obtained.

Example V

Ten grams of Fe (20 mesh) were refluxed in an inert atmosphere with 20 ml. of $TiCl_4$ for twelve hours and the surface of the iron was coated and discolored, after which on cooling, there was added 150 ml. toluene and the reaction mixture was heated to 100° C. Ethylene was then bubbled slowly into the reaction mixture, with active stirring, for four hours. The reaction mixture was then diluted with methanol and about 5 grams of thick polyethylene oil isolated.

Example VI

Ten grams of iron was refluxed with 5 ml. TiCl$_4$ for three hours, after which 100 ml. of toluent was added and ethylene introduced in the reaction mixture and processed as in Example V. An oil was isolated as in Example V but it was more viscous than the polyethylene oil of that example.

In the ethylene polymerization step, the reaction temperature is suitably room temperature (about 20° C.) to 200–250° C., and the reaction pressure can range from atmospheric pressure to fairly high pressures, i.e., up to 10,000 p.s.i. and even higher. Obviously when it is desired to use a temperature higher than that of the boiling point of the inert solvent selected, the reaction must be carried out at superatmospheric pressure. Ordinarily, pressures ranging from atmospheric pressure (to slightly higher, e.g., 5 p.s.i.g.) to about 500–1000 p.s.i.g. will give a good yield of product As a polymerization menstruum, substantially any inert material can be used which is liquid under the conditions of temperature and pressure employed and which has a solvent action on ethylene These solvents are well-known to those skilled in the art. Hydrocarbon solvents are preferred, and are preferably substantially free of materials that react with lower chlorides of titanium, e.g., water, CO$_2$, O$_2$, and the like. Suitable solvents include pentane, hexane, heptane, cyclohexane, octane, benzene, xylene, toluene, and the like. The aromatic hydrocarbons are the preferred solvents.

The amount of catalyst is not critical. Relatively small amounts are operable to form relatively large amounts of polyethylene. In general, a practical range is 0.001–0.1 gram activated iron per gram of ethylene polymerized. Even larger amounts of catalyst are operable, but present a purification problem as well as an economic problem.

Example VII 12.2 grams of electrolytic iron (200 mesh) is refluxed in N$_2$ for 48 hours with 8 ml. TiCl$_4$ in a 250 ml. three-neck flask equipped with reflux condenser, nitrogen inlet, and stirrer. The mixture is cooled, washed with toluene, then with heptane, and 100 ml. dry toluene added, after which the activated Fe catalyst mass in toluene is transferred to a 200-cc. stainless steel autoclave. The autoclave is pressurized with ethylene to a range varying between 300–550 p.s.i. while being heated to a temperature in the range of 120–160° C. Continuous repressurizing with ethylene is necessary to maintain the aforementioned pressure range for 24 hours. Upon depressurizing and cooling of the autoclave a good yield of highly crystalline polyethylene is obtained.

The following examples set forth alternate procedures for heating Fe with TiCl$_4$ to provide the activated Fe catalyst of this invention.

Example VIII

Iron filings were crushed to provide finely divided material of a particle size such that most of it passed through a 20-mesh screen but was mostly retained in a 30-mesh screen; it contained, however, 1–2 percent of minus 100-mesh material. One part by weight of this material was placed in a vessel equipped with reflux condenser and containing about 10 parts by weight of TiCl$_4$. The mixture was boiled under reflux for two hours while passing nitrogen through the vessel so as to prevent pick-up of moisture from the atmosphere. The resultant mixture contains activated Fe metal catalyst, which can be recovered and used as such, or, if desired, the entire mixture can be used, including unreacted TiCl$_4$ and by-product chlorides, with results as herein described.

Example IX

A catalyst was prepared by passing TiCl$_4$ vapor for 6 hours through a glass tube packed with finely divided Fe maintained at a temperature of 125–140° C. The resultant material was allowed to cool under a stream of nitrogen, and was stored under slight nitrogen pressure.

The uses of the polyethylenes of this invention are analogous to the uses of those prepared by prior art procedures. The solid polyethylenes of this invention can be used to make moldings, film, filament, pipe, tubing, extruded articles and the like, using the same equipment and techniques customary for solid polyethylenes of the prior art. The liquid polymers prepared by the process of this invention are useful as chemical intermediates for alkylation, epoxidation, and the like by procedures well known to those skilled in the art, as well as for plasticizers for the solid polymers produced by the procedures herein described, e.g., 1 part of the viscous oil produced in Example IV can be thoroughly mixed with 10 parts of the solid polymer produced in Example II to give a product that is readily extruded into sheet in conventional sheet-extrusion apparatus.

I claim:

1. The method of polymerizing ethylene that includes the steps of heating at a temperature of at least 130° C. a mixture consisting essentially of titanium tetrachloride and iron in the ratio of at least 1 mole TiCl$_4$ per 1400 moles of Fe, stopping the reaction before all the Fe is consumed, to form a product comprising iron and a reaction product of iron and titanium tetrachloride, removing hydrocarbon soluble chlorides from the said product to form a polyethylene catalyst, and thereafter contacting ethylene in an inert hydrocarbon solvent with the said catalyst.

2. The method according to claim 1 in which the polymerization is carried out at super atmospheric pressure.

3. The method according to claim 1 in which the pressure is 5 to 1000 p.s.i.g.

4. The method according to claim 1 in which the weight ratio of catalyst to ethylene polymerized is about 1:10–1000.

5. The method according to claim 1 in which the temperature of the polymerization is at least 20° C.

6. The method according to claim 5 in which the polymerization temperature is 20 to 250° C.

7. The method of making a polyethylene catalyst that includes the steps of heating a mixture consisting essentially of TiCl$_4$ with Fe in the ratio of at least 1 mole TiCl$_4$ per 1400 moles of Fe; stopping the reaction before all the Fe is consumed; removing hydrocarbon-soluble chlorides from the thus-formed reaction product; and recovering a TiCl$_4$-free product comprising Fe metal and a reaction product of Fe and TiCl$_4$.

8. The method according to claim 7 in which the heating step is carried out by boiling Fe with TiCl$_4$ for about 2 to 48 hours.

9. The method according to claim 7 in which the heating step is carried out by subjecting Fe to TiCl$_4$ vapor at 200–500° C.

References Cited in the file of this patent

FOREIGN PATENTS 874,215     Germany _____ Apr. 20, 1953

OTHER REFERENCES

"Zeitschrift für Anorg. Chem." (Band 128), February 23, 1923, article entitled Die Reduktion des Titantetrachlorids by Ruff et al. (pages 81–95; pages 84 and 93 relied on).